United States Patent
Srivastava et al.

(10) Patent No.: US 8,689,033 B2
(45) Date of Patent: Apr. 1, 2014

(54) POWER SUPPLY AND DATA SIGNAL INTERFACE CIRCUIT WITH OVERVOLTAGE PROTECTION

(75) Inventors: Amit K. Srivastava, Raebareli (IN); Parul K. Sharma, Noida (IN)

(73) Assignee: Freescale Semiconductor, Inc., Austin, TX (US)

( * ) Notice: Subject to any disclaimer, the term of this patent is extended or adjusted under 35 U.S.C. 154(b) by 494 days.

(21) Appl. No.: 13/191,459

(22) Filed: Jul. 27, 2011

(65) Prior Publication Data

US 2013/0031398 A1    Jan. 31, 2013

(51) Int. Cl.
G06F 1/00 (2006.01)
G06F 1/26 (2006.01)
H02H 9/04 (2006.01)
H02H 7/125 (2006.01)

(52) U.S. Cl.
CPC ............ H02H 9/046 (2013.01); H02H 7/1252 (2013.01)
USPC ............. 713/340; 361/18; 361/90; 361/91.1; 361/91.2

(58) Field of Classification Search
CPC ............................ H02H 9/046; H02H 7/1252
USPC ............................ 713/340; 361/90, 91.1, 91.2
See application file for complete search history.

(56) References Cited

U.S. PATENT DOCUMENTS

| | | | |
|---|---|---|---|
| 6,473,284 B1* | 10/2002 | Ilic et al. | 361/91.1 |
| 7,649,726 B2 | 1/2010 | Castro | |
| 7,656,119 B2 | 2/2010 | Kim | |
| 8,203,815 B2* | 6/2012 | Kilroy et al. | 361/91.1 |
| 8,508,900 B2* | 8/2013 | Tsugawa | 361/91.1 |
| 2009/0103219 A1 | 4/2009 | Tamegai | |
| 2010/0073837 A1 | 3/2010 | Predtetchenski et al. | |
| 2010/0188785 A1 | 7/2010 | Gascuel | |
| 2012/0112686 A1* | 5/2012 | Zhang et al. | 320/107 |
| 2012/0126625 A1* | 5/2012 | Maher et al. | 307/80 |

* cited by examiner

Primary Examiner — Fahmida Rahman
Assistant Examiner — Alyaa T Mazyad
(74) Attorney, Agent, or Firm — Charles Begere

(57) ABSTRACT

A data processing device with a power supply and data signal interface circuit has a switch for connecting an external line and an internal node. The power supply and data signal interface circuit also includes a controller for applying an enabling voltage to the switch enabling the switch to supply current between the external line and the internal node in the presence of power supply to the controller and in the absence of the overvoltage condition on the external line. The power supply and data signal interface circuit also includes a voltage reduction connection from the external line for applying a control voltage to the switch in the absence of power supply to the controller. The control voltage from the voltage reduction connection limits a voltage applied to the internal node through the switch in the presence of the overvoltage condition.

15 Claims, 2 Drawing Sheets

POWER SUPPLY AND DATA SIGNAL INTERFACE CIRCUIT WITH OVERVOLTAGE PROTECTION

BACKGROUND OF THE INVENTION

The present invention is directed to a power supply and data signal interface circuit for a data processing device and, more particularly, to a power supply and data signal interface circuit with overvoltage protection.

A power supply and data signal interface circuit can be connected to an external line for conducting power and data signals between a data processing device and external circuitry. Power and data signal interface circuits are designed and standardized for a specified range of electrical characteristics to enable the interface circuits to operate without risk of damage. However, technical progress and widespread adoption enlarge the field of use to circumstances that were not originally envisaged such that it is necessary to provide protection in the interface. An example is the voltage of the power supply and protection of the device and the interface itself from overvoltage, that is to say an externally forced power supply voltage exceeding the normal specification.

An example of a power and signal interface is the Universal Serial Bus ('USB') interface. The USB interface specification was developed to establish communication between peripheral devices and a host controller such as a personal computer. The host controller also provides a power supply for the peripheral device. USB interfaces are now used in a variety of devices such as mice, keyboards, digital cameras, printers, personal media players, flash drives, cell phones, video game consoles and external hard drives. For many of these devices, the USB is the standard connection method.

Typically, a USB connection is made over a cable including power supply lines and data exchange lines. Many portable devices have adopted a USB connector not only for USB data transfer and power supply but also for connecting a battery charger to the portable device. While the originally specified charger or controller is used, there is little risk of overvoltage. However, it is now desired to use a USB connection to connect power supplies or battery chargers to power management integrated circuits ('PMICs') of devices where the power supplies or chargers supply a voltage higher than that provided for in the USB specification. More particularly, the USB specification is based on a 5V maximum nominal power supply for a device operating on 3.3V. The Battery Charger addendum to the USB specification specifies battery charging through the USB $V_{BUS}$ pin. Commercial battery chargers may generate power supply at up to 20V. For example, in the automobile industry, an automotive electrical system may have a nominal voltage of 12V and a peak voltage that may reach 20V. Application of such a high voltage to the USB interface constitutes a voltage sufficient to cause severe damage to the interface and to the device in the absence of overvoltage protection.

A number of criteria may complicate the provision of overvoltage protection for a power and data signal interface. For example, the overvoltage protection should not interfere with normal functions in the absence of overvoltage. The overvoltage protection should function effectively even in the presence of fast supply voltage ramp rates. The overvoltage protection also should function even in the absence of an internal power supply for the device, for example if the battery is discharged or if the device is on standby with its internal power supply turned off to save power. Thus, it would be desirable to have a power supply and data signal interface circuit with overvoltage protection that does not interfere with normal operation of the interface circuit.

BRIEF DESCRIPTION OF THE DRAWINGS

The present invention is illustrated by way of example and is not limited by embodiments thereof shown in the accompanying figures, in which like references indicate similar elements. Elements in the figures are illustrated for simplicity and clarity and have not necessarily been drawn to scale.

DETAILED DESCRIPTION OF PREFERRED EMBODIMENTS OF THE INVENTION

An example of an embodiment of the invention described below is a USB device. However, other embodiments of the invention are applicable to other data processing devices which include an internal node and a power supply and data signal interface circuit for connection to an external line, and in which the interface circuit includes overvoltage protection for the data processing device from the external line.

Figure 1:
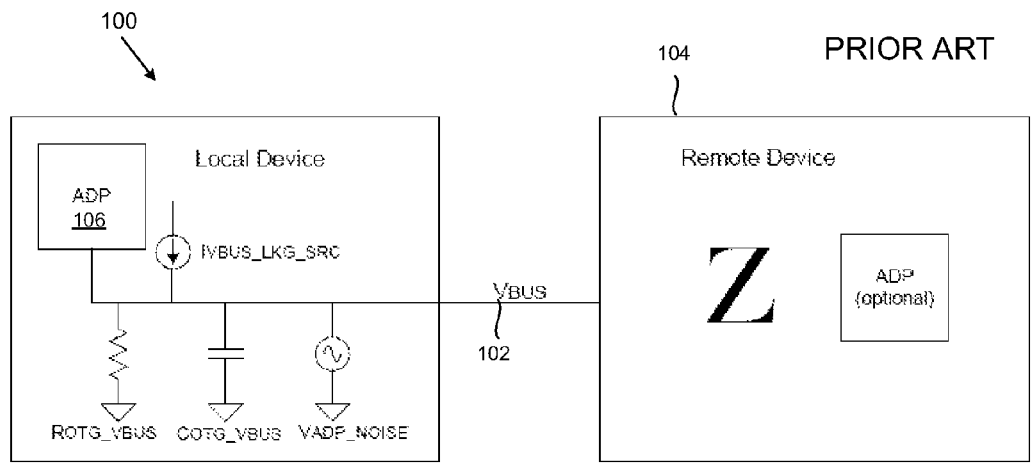
FIG. 1 is a schematic diagram of a conventional USB device.
Figure 2:
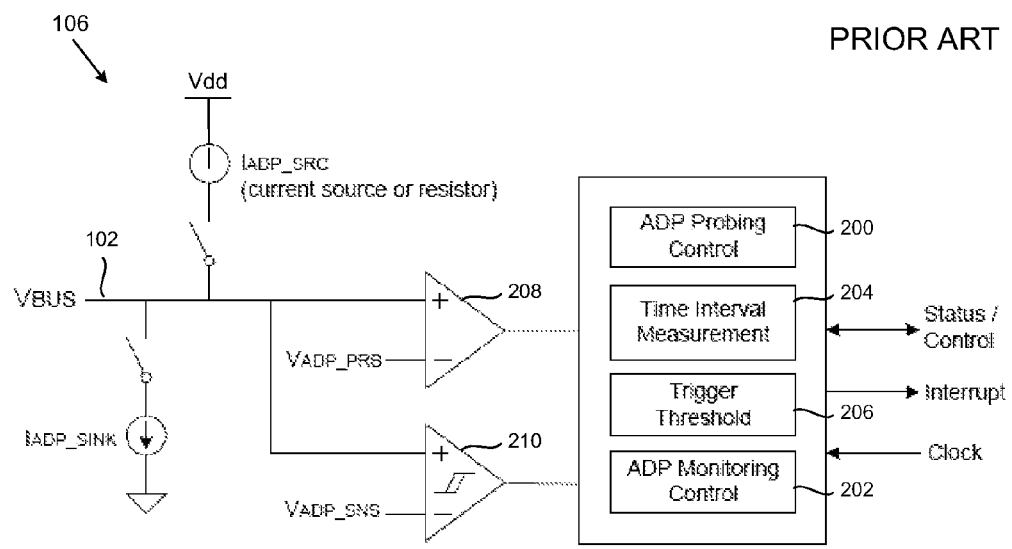
FIG. 2 is a more detailed schematic diagram of the device of FIG. 1.

FIGS. 1 and 2 show an example of a conventional USB device 100 compliant with the USB On The Go ('OTG') standard. USB OTG allows two USB devices to communicate without requiring a general purpose computer to manage the communication. Under USB OTG, one device has the role of host and the other devices with which the host communicates are USB peripherals. However, a device may be dual role, that is to say capable of functioning as either host or peripheral. Under OTG two dual role devices can exchange host and peripheral roles. The initial roles are defined by the type of USB plug type A or type B on the cable end to which the device is connected by a type AB receptacle. Roles can then be exchanged between two dual role devices by a Host Negotiation Protocol. The A-device continues to supply power over the $V_{BUS}$ pin even if it becomes the peripheral instead of being the host. However, the A-device can switch to a standby state in which it turns off $V_{BUS}$, ending the OTG session and saving power. The B-device can then sense the end of the OTG session and also adopt a standby state. A Session Request Protocol ('SRP') allows a B-Device to request an A-Device to turn on $V_{BUS}$ power and start an OTG session. Using the SRP, the B-device pulses first the D+ data line, and then the $V_{BUS}$ power supply line to wake up the A-Device.

An Attach Detection Protocol ('ADP') driven by an OTG device allows it to detect when a remote device has been attached or detached. The device performing ADP probing can be an OTG A-device, an OTG B-device, or an OTG Embedded Host ('EH') SRP-capable peripheral-only B-device. The remote device can be any USB device. ADP operates by the device detecting the change in $V_{BUS}$ capacitance that occurs when a remote device is attached or detached. The capacitance is detected by probing while no OTG session is current. ADP probing involves the device first discharging the $V_{BUS}$ line, and then measuring the time it takes $V_{BUS}$ to charge to a known voltage with a known current source. A change in capacitance is detected by looking for a change in the charge time. After an OTG session has ended, an ADP capable B-device performs ADP sensing, by which it detects connection of a remote device by sensing ADP probing pulses applied to the $V_{BUS}$ line of the cable by the remote A-device. If the remote probing pulses from the remote A-device are not detected within the specified period after the end of the session, the B-device itself performs ADP probing.

Both SRP and ADP probing and sensing involve pulsing the voltage on the $V_{BUS}$ line of the cable at voltages within the USB specification at voltages less than 3.3V. The voltage pulses should pass through the power and signal interface even in the absence of an internal and/or external power supply for the device, for example if the battery is discharged, or if the device is on standby with its internal power supply turned off to save power.

FIG. 1 illustrates basic parameters of a USB OTG device 100 connected by a cable including a $V_{BUS}$ line 102 to a USB device 104, which may or may not be an OTG device. The device 100 includes control and processing circuits such as an ADP controller 106 and presents to the $V_{BUS}$ line 102 a resistance to earth $R_{OTG\_VBUS}$, a capacitance to earth $C_{OTG\_VBUS}$, a source of leakage current $I_{VBUS\_LKG\_SRC}$ and a source of noise voltage $V_{ADP\_NOISE}$. The remote USB device presents a complex impedance Z to the $V_{BUS}$ line 102 and may or may not also include an OTG controller 108.

FIG. 2 illustrates basic modules in an ADP controller 106. The ADP controller 106 includes an ADP probing controller 200 and an ADP monitoring controller 202. Time intervals are measured by a module 204. A module 206 defines trigger thresholds. The ADP probing controller 200 controls a current source $I_{ADP\_SRC}$ connected between $V_{BUS}$ and the internal regulated voltage rail $V_{DD}$, and a current sink $I_{ADP\_SNS}$ connected between $V_{BUS}$ and ground. A comparator 208 compares the voltage on the line $V_{BUS}$ with a threshold voltage $V_{ADP\_PRB}$. A comparator 210 compares the voltage on the line $V_{BUS}$ with a threshold voltage $V_{ADP\_SNS}$.

In operation in compliance with the USB OTG standard, the capacitance on the $V_{BUS}$ line is measured. The device 100 first discharges the $V_{BUS}$ line below a voltage $V_{ADP\_DSCHG}$ by turning ON the current sink $I_{ADP\_SINK}$ for a fixed time. After the $V_{Bus}$ voltage is below $V_{ADP\_DSCHG}$, the current sink is turned OFF, and the current source $I_{ADP\_SRC}$ is turned ON. When the $V_{BUS}$ voltage reaches the threshold voltage $V_{ADP\_PRE}$, the current source is turned OFF. The time required for $V_{BUS}$ to reach $V_{ADP\_PRB}$ is measured.

After a time of either $T_{A\_ADP\_PRB}$ for an A-device or $T_{B\_ADP\_PRB}$ for a B-device, this probe cycle is repeated, and the rise time is again measured. If both devices happen to be probing on attachment the different values of probe time for A-devices and B-devices prevent repeated collisions between successive probes. If a remote device is attached or detached, then the rise time changes. A B-device can turn on its probe sensing in a small window around the expected probing time in order to save energy.

Figure 3:
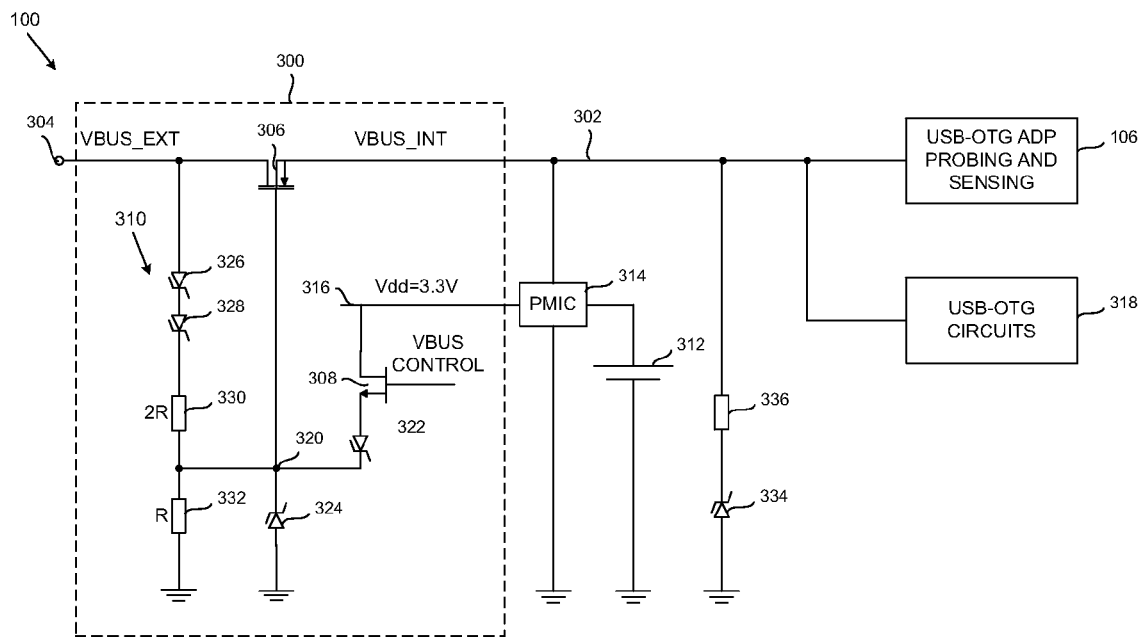
FIG. 3 is a schematic diagram of a USB device in accordance with an embodiment of the present invention.

FIG. 3 illustrates a data processing device 100 in accordance with one example of an embodiment of the present invention. The data processing device 100 comprises a power and signal interface 300 and an internal node 302. The power and signal interface 300 can be connected to an external line 304 for conducting power and signals between the device 100 and an external element (not shown). The power and signal interface 300 comprises a switch 306 having a current conduction path for connecting the external line 304 and the internal node 302, and a control terminal for controlling the current conduction path. The switch 306 is capable of withstanding an overvoltage condition on the external line 304. The power and signal interface 300 also includes a controller 308 for applying an enabling voltage to the control terminal of the switch 306. The enabling voltage enables the current conduction path of the switch 306 to supply current between the external line 304 and the internal node 302 in the presence of power supply to the controller 308 and in the absence of the overvoltage condition on the external line 304. The power and signal interface 300 also includes a voltage reduction connection 310 from the external line 304 for applying a control voltage to the control terminal of the switch 306. The control voltage enables the current conduction path to supply current between the external line 304 and the internal node 302 in the absence of power supply to the controller 308. The control voltage from the voltage reduction connection 310 limits a voltage applied to the internal node 302 through the current conduction path of the switch 306 in the presence of the overvoltage condition.

In more detail, the data processing device 100 shown in FIG. 3 is compliant with a USB OTG standard. When the external line 304 is connected to a USB host or a USB A-device, the power and signal interface 300 receives a nominal voltage of 5V from the external line 304, with a maximum specified value of 6.5V. When the external line 304 is connected to a charger, for example of an automobile, the power and signal interface 300 may receive a nominal voltage of 12V from the external line 304, with a maximum value which may reach 20V.

The data processing device 100 shown in FIG. 3 includes an internal source of power 312 for supplying power to the internal node 302. In this case, the internal source of power 312 is a battery which is rechargeable through the external line 304 and the current conduction path of the switch 306. The data processing device 100 shown in FIG. 3 also includes a power management integrated circuit ('PMIC') 314. The PMIC 314 controls charging of the battery 312 and power supply from the battery 312. The PMIC 314 regulates the voltage $V_{BUS\_INT}$ on the internal node 302, in this case a power supply bus, down to a voltage $V_{DD}$ for an internal power supply rail 316, $V_{DD}$ in this case being 3.3V. In the example shown in FIG. 3, the PMIC 314 is connected to receive power from the internal node 302 for charging the battery 312. In another example, the PMIC 314 is capable of withstanding overvoltage and is connected to receive power directly from the external line 304 for charging the battery 312.

The data processing device 100 shown in FIG. 3 also includes USB-OTG ADP probing and sensing circuits 106 as well as other USB-OTG circuits 318. The controller 308 may normally be supplied with power from the internal source of power 312 or from an independent source of power. In the example illustrated in FIG. 3, the controller 308 comprises a field effect transistor ('FET') switch having a source connected to a node 320 through a normally forward biased zener diode 322 and a drain connected to the internal power supply rail 316. USB-OTG circuits 318 provide a control signal to a control terminal of the FET switch of the controller 308 enabling ADP signalling during normal operation by switching the voltage at the node 320. The node 320 is connected to ground through a reverse biased zener diode 324. The switch 306 is an FET whose current conduction path is controlled by a gate electrode connected to the node 320.

The voltage reduction connection 310 comprises two forward biased diodes 326 and 328 connected between the external line 304 and ground in series with a voltage divider. The voltage divider comprises a resistor 330 connected to the diode 328 and a resistor 332 connected to ground, the resistance of the resistor 330 being twice that of the resistor 332. The tap of the voltage divider is connected to the node 320. A reverse biased zener diode 334 is connected in series with a current limiting resistor 336 between the internal node 302 and ground. The diodes 326 and 328 may be simply rectifying diodes but in this case, since the IC includes zener diodes anyway, it is convenient for the diodes 326 and 328 to be zener diodes. The zener diodes 322, 326, 328 and 334 have forward voltage drops of 0.7V and reverse breakdown voltages of 5.0V in this example.

In normal operation, in the absence of overvoltage on the external line 304, a control voltage from the USB-OTG circuits 318 switches the FET switch of the controller 308 ON, which pulls the anode of the zener diode 322 up to the voltage $V_{DD}$ of the internal power supply rail 316, and pulls the node 320 up to a voltage reduced by the forward voltage drop across the zener diode 322, in this case to 2.6V. This voltage at the node 320 applied to the control terminal of the switch 306 switches the switch 306 ON but limits the voltage on the internal node 302 to the same value of 2.6V. This configuration enables the device 100 to perform ADP pulsing The controller 308 turning the switch 306 ON is effective as long as it is supplied with power, in this case as long as the internal power supply rail 316 is energized.

However, the internal power supply rail 316 is not always energized, for example if the battery 312 is discharged or if the device is on standby with its internal power supply turned off to save power. If the switch 306 is OFF the internal node 302 is disconnected from the external line 304 which would prevent signaling through the switch 306. However, if a normal USB voltage is applied to the external line 304, by a USB host or A-device, the voltage reduction connection 310 turns the switch 306 ON, permitting signaling and energizing the internal node 302 through the switch 306. The voltage $V_{BUS}$ of 5.0V is reduced to 3.6V by the forward-biased voltage drop across the diodes 326 and 328 so that a control voltage of 1.2V appears across the resistor 332 and is applied to the node 320 to turn the switch 306 ON and enable signaling through the switch 306. The control voltage of 1.2V initially limits the voltage on the internal node 302 to the same value until internal power becomes available and the enabling voltage from the controller 308 is established.

In the case of an overvoltage on the external line 304, the voltage reduction connection 310 and the zener diode 324 act to limit the voltage applied to the control terminal of the switch 306 to a safe value of 5V even in the absence of an internal power supply for the device. The voltage at the source of the n-type switch 306 cannot exceed the voltage at its gate, so that the voltage at the node 302 cannot exceed the voltage at the node 320. A maximum overvoltage of 20V, which would develop a voltage across the voltage divider 330, 332 of 18.6V, would tend to produce a voltage of 6.2V across the resistor 332. The reverse biased zener diode 324 limits the voltage at the node 320 to 5.0V even in the presence of inrush current from the voltage reduction connection, protecting the components and limiting the voltage $V_{BUS\_INT}$ on the internal node 302 to specification. The zener diode 322 acts to protect the FET of the controller 308 from excess voltage even in the presence of inrush current from the voltage reduction connection. The zener diode 334 acts to protect the internal node 302 from excess voltage caused by inrush current into the circuits of the device 100.

In the foregoing specification, the invention has been described with reference to specific examples of embodiments of the invention. It will, however, be evident that various modifications and changes may be made therein without departing from the broader spirit and scope of the invention as set forth in the appended claims.

The terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein. Unless stated otherwise, terms such as "first" and "second" are used to arbitrarily distinguish between the elements such terms describe. Thus, these terms are not necessarily intended to indicate temporal or other prioritization of such elements. If certain measures are recited in mutually different claims it does not indicate that a combination of these measures cannot be used to advantage.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, a plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will appreciated that conductivity types and polarities of potentials may be reversed. Further, each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Those skilled in the art also will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments. Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner. However, other modifications, variations and alternatives are also possible. The specifications and drawings are, accordingly, to be regarded in an illustrative rather than in a restrictive sense.

In the claims, the word 'comprising' does not exclude the presence of other elements or steps then those listed in a claim. Furthermore, the terms "a" or "an" are defined as one or more than one. The use of introductory phrases such as "at least one" and "one or more" should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

The invention claimed is:

1. A data processing device comprising an internal node, and a power supply and data signal interface for connection to an external line for conducting power and data signals between the data processing device and an external element, said power supply and data signal interface comprising:
 a switch having a current conduction path for connecting said external line and said internal node, and a control terminal for controlling said current conduction path, said switch being capable of withstanding an overvoltage condition on said external line;
 a controller for applying an enabling voltage to said control terminal, said enabling voltage enabling said current conduction path to supply current between said external line and said internal node in the presence of power supply to said controller and in the absence of said overvoltage condition on said external line; and
 a voltage reduction connection from said external line for applying a control voltage to said control terminal, said control voltage enabling said current conduction path to supply current between said external line and said internal node in the absence of power supply to said controller, said control voltage limiting a voltage applied to said internal node through said current conduction path in the presence of said overvoltage condition.

2. The data processing device of claim 1, wherein said voltage reduction connection comprises a voltage divider for connection to said external line.

3. The data processing device of claim 1, wherein said voltage reduction connection includes at least one diode for preventing a voltage at said control terminal from being applied through said voltage reduction connection to said external line.

4. The data processing device of claim 1, wherein said power supply and data signal interface comprises a voltage limiter for limiting a voltage applied to said control terminal in the presence of inrush current from said voltage reduction connection.

5. The data processing device of claim 1, wherein said power supply and data signal interface comprises a voltage limiter for limiting said voltage applied to said internal node in the presence of inrush current through said current conduction path from said external line.

6. The data processing device of claim 1, further comprising an internal power source for supplying power to said internal node, wherein said internal power source is rechargeable through said external line and said current conduction path.

7. The data processing device of claim 1, wherein said controller normally is supplied with power from said internal node.

8. The data processing device of claim 1, wherein said device complies with a Universal Serial Bus standard.

9. The data processing device of claim 1, wherein said device complies with a Universal Serial Bus On The Go standard.

10. A data processing device comprising an internal node, and a power supply and data signal interface for connection to an external line for conducting power and data signals between the data processing device and an external element, said power supply and data signal interface comprising:
 a switch having a current conduction path for connecting said external line and said internal node, and a control terminal for controlling said current conduction path, said switch being capable of withstanding an overvoltage condition on said external line;
 a controller for applying an enabling voltage to said control terminal, said enabling voltage enabling said current conduction path to supply current between said external line and said internal node in the presence of power supply to said controller and in the absence of said overvoltage condition on said external line;
 a voltage reduction connection from said external line for applying a control voltage to said control terminal, said control voltage enabling said current conduction path to supply current between said external line and said internal node in the absence of power supply to said controller, said control voltage limiting a voltage applied to said internal node through said current conduction path in the presence of said overvoltage condition; and
 an internal power source for supplying power to said internal node, wherein said internal power source is rechargeable through said external line and said current conduction path.

11. The data processing device of claim 10, wherein said voltage reduction connection comprises a voltage divider for connection to said external line.

12. The data processing device of claim 10, wherein said voltage reduction connection includes at least one diode for preventing a voltage at said control terminal from being applied through said voltage reduction connection to said external line.

13. The data processing device of claim 10, wherein said power supply and data signal interface comprises a voltage limiter for limiting a voltage applied to said control terminal in the presence of inrush current from said voltage reduction connection.

14. The data processing device of claim 10, wherein said power supply and data signal interface comprises a voltage limiter for limiting said voltage applied to said internal node in the presence of inrush current through said current conduction path from said external line.

15. A data processing device comprising an internal node, and a power supply and data signal interface for connection to an external line for conducting power and data signals between the data processing device and an external element, said power supply and data signal interface comprising:
- a switch having a current conduction path for connecting said external line and said internal node, and a control terminal for controlling said current conduction path, said switch being capable of withstanding an overvoltage condition on said external line;
- a controller for applying an enabling voltage to said control terminal, said enabling voltage enabling said current conduction path to supply current between said external line and said internal node in the presence of power supply to said controller and in the absence of said overvoltage condition on said external line;
- a voltage reduction connection from said external line for applying a control voltage to said control terminal, said control voltage enabling said current conduction path to supply current between said external line and said internal node in the absence of power supply to said controller, said control voltage limiting a voltage applied to said internal node through said current conduction path in the presence of said overvoltage condition, wherein said voltage reduction connection includes at least one diode for preventing a voltage at said control terminal from being applied through said voltage reduction connection to said external line; and
- an internal power source for supplying power to said internal node, wherein said internal power source is rechargeable through said external line and said current conduction path.

* * * * *